B. MAWSON AND A. KENNEDY.
SHIP'S PORT LIGHT AND DEAD LIGHT.
APPLICATION FILED DEC. 27, 1919.

1,364,293.

Patented Jan. 4, 1921.

Witnesses.
John H Walker
Herbert White.

Inventors.
Benjamin Mawson
Alfred Kennedy.

UNITED STATES PATENT OFFICE.

BENJAMIN MAWSON, OF LIVERPOOL, AND ALFRED KENNEDY, OF LITHERLAND, NEAR LIVERPOOL, ENGLAND.

SHIP'S PORT-LIGHT AND DEAD-LIGHT.

1,364,293.    Specification of Letters Patent.    Patented Jan. 4, 1921.

Application filed December 27, 1919. Serial No. 347,825.

*To all whom it may concern:*

Be it known that we, BENJAMIN MAWSON, a subject of the King of England, residing at 74 Spofforth Road, Wavertree, Liverpool, in the county of Lancaster, England, and ALFRED KENNEDY, a subject of the King of England, residing at 28 Palmerston Drive, Litherland, near Liverpool, in the county of Lancaster, England, have invented certain new and useful Improvements in Ships' Port-Lights and Dead-Lights, of which the following is a specification.

This invention relates to ships' port lights and dead lights, and has for its object to provide a port light or a dead light which shall afford efficient ventilation and prevent inflow of water.

A port light or dead light, according to our invention, comprises a plate in which a gap or opening is formed, and a box or duct, communicating with said plate-gap, provided with air ventilation opening or openings, and embodying means, such as a valve or valves, baffle plates, or the like, whereby water which may enter the box or duct is prevented from passing through said ventilation opening or openings thereof.

In a preferred construction, said gap or opening of said plate is formed in the lower portion thereof, and the box or duct is formed by concentric walls or flanges and end walls or flanges in which latter ventilation openings are provided; buoyant ball valves are employed to close said ventilation openings on an in-rush of water into said box.

We will further describe our invention with the aid of the accompanying sheet of explanatory drawings, which illustrate by way of example only, a ship's port light according to a preferred construction.

In said drawings:—

Figure 1:
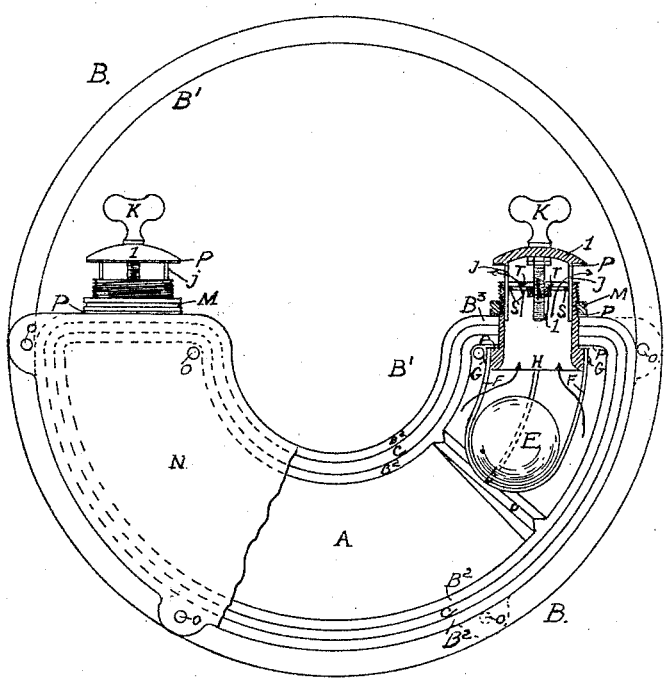
Figure 2:
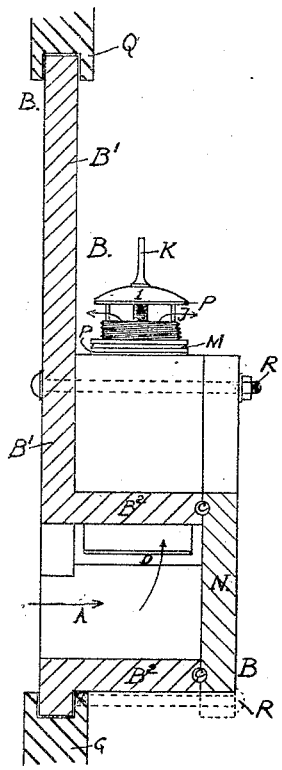

Figure 1 is an elevation of the port light, a portion whereof is broken away, and a part is in section; and Fig. 2 is a transverse section.

In said drawings Q indicates the porthole frame; B generally designates the port light of which $B^1$ is a plate of glass at the lower part whereof is formed a cap or opening A, and on inner—or room—side whereof is integrally molded a box or duct, which is formed by the concentric walls or flanges $B^2$, and horizontal end walls or flanges $B^3$ wherein ventilation openings are provided.

The box is closed by means of a cover plate N which is secured to the frame Q by screws R passed through holes O formed in said plate N. A water-tight joint is made between the face of said box or duct and the cover plate N by means of a packing ring C of soft rubber or the like.

Extending through the openings of each of the horizontal end portions $B^3$ of said box or duct wall is a valve casing H which is positioned by means of a nut M screwed on to an externally screw-threaded portion of the casing, and whereby vertical adjustment of said casing may be effected.

Secured to each of said valve casings by means of screws G is a cage F in which normally rests a hollow india-rubber or metal ball.

Extending transversely of a valve casing H is a diaphragm plate S on which is formed a nut L, and wherein are provided air passages T, and passages adapted to receive the guide rods J of a vent cap I; and engaging with said nut L of plate S is a screw K which is screwed to said cap I. P P, indicate joint making rings or washers.

Air enters said inlet opening A of the port light, and, passing upward by way of the box or duct and the interior of said valve casings H, enters the room; should, however, there be an inrush of water into said port opening A due to a sea wave, the rolling of the ship, or other cause, the ball valves E are floated upwardly from their positions of rest in cages F and seating themselves against the lower faces of their respective casings seal same.

When the water recedes again, the balls E fall and re-open the ventilation passages of the box.

Triangular baffle plates D are integrally formed in said duct, with the object of directing water on to the balls E.

By turning a screw K in one direction or the other a cap I may be raised or lowered (being prevented from rotating by said rods J) and, when required, one or both of said caps I may be screwed down upon the upper face of its casing to close it completely.

Having now described our invention, what we claim as new and desire to secure by Letters Patent is:—

1. A ship's light comprising, in combination, a plate wherein a gap is formed; a semi-cylindrical air duct having its middle portion communicating with said plate-gap; and self-closing valvular means at one end of said air duct whereby water which may enter said air duct is prevented from discharging therethrough.

2. A ship's light comprising, in combination, a plate in the lower portion whereof a gap is formed; an air duct composed of concentric walls, apertured end walls, and a cover plate; and self-closing valves whereby water which may enter said duct is prevented from discharging therethrough.

3. A ship's light comprising a plate having a semi-cylindrical air duct therein composed of concentric walls, apertured end walls, and a cover plate; said plate having a gap intermediate the ends of said air duct and opposite said cover plate; and a self-closing valve whereby water which may enter said duct is prevented from passing therethrough.

4. A ship's light comprising, in combination, a plate in the lower portion whereof a gap is formed; an air duct composed of concentric walls, apertured end walls and a cover plate; valve casings extending through said end wall apertures; cages secured to said valve casings; and buoyant ball valves located in said cages.

5. A ship's light comprising, in combination, a plate in the lower portion whereof a gap is formed; an air duct composed of concentric walls, apertured end walls and a cover plate; valve casings extending through said end wall apertures; cages secured to said valve casings; buoyant ball valves located in said cages, and caps adjustably disposed at the upper ends of said valve casings.

In testimony whereof we affix our signatures in the presence of two witnesses.

BENJAMIN MAWSON.
ALFRED KENNEDY.

Witnesses:
JOHN H. WALKER,
EMILY BURNETT.